United States Patent [19]
Hobson

[11] 3,938,148
[45] Feb. 10, 1976

[54] AUTOMATIC FREQUENCY CONTROL SYSTEM

[75] Inventor: Charles A. Hobson, Fremont, Calif.

[73] Assignee: The United States of America as represented by the Secretary of the Navy, Washington, D.C.

[22] Filed: July 10, 1974

[21] Appl. No.: 487,341

[52] U.S. Cl. .............................................. 343/7 A
[51] Int. Cl.² ........................................... G01S 7/02
[58] Field of Search ............................... 343/7 A, 8

[56] References Cited
UNITED STATES PATENTS

| | | | |
|---|---|---|---|
| 3,212,083 | 10/1965 | Hinchman ..................... | 343/7 A X |
| 3,394,371 | 7/1968 | Mahler ........................... | 343/7 A X |

*Primary Examiner*—T. H. Tubbesing
*Attorney, Agent, or Firm*—R. S. Sciascia; Charles D. B. Curry

[57] ABSTRACT

An automatic frequency control system that is particularly suited for use with an aircraft launched radar controlled guided missile. The missile automatic frequency control system is made entirely of solid state devices including a voltage tuned solid state oscillator. The system employs a search mode of operation and two lock modes of operation. The search mode of operation occurs prior to missile launch when the aircraft radar and the missile control system are both scanning for a target and the reflected signal from the target has not been received by the missile control system. The two lock modes of operation are false lock and real lock. False lock occurs when the missile receives a false signal from the doppler radar of a nearby aircraft, for example. Real lock occurs during missile free flight when the missile receives a reflected radar signal from the target.

10 Claims, 3 Drawing Figures

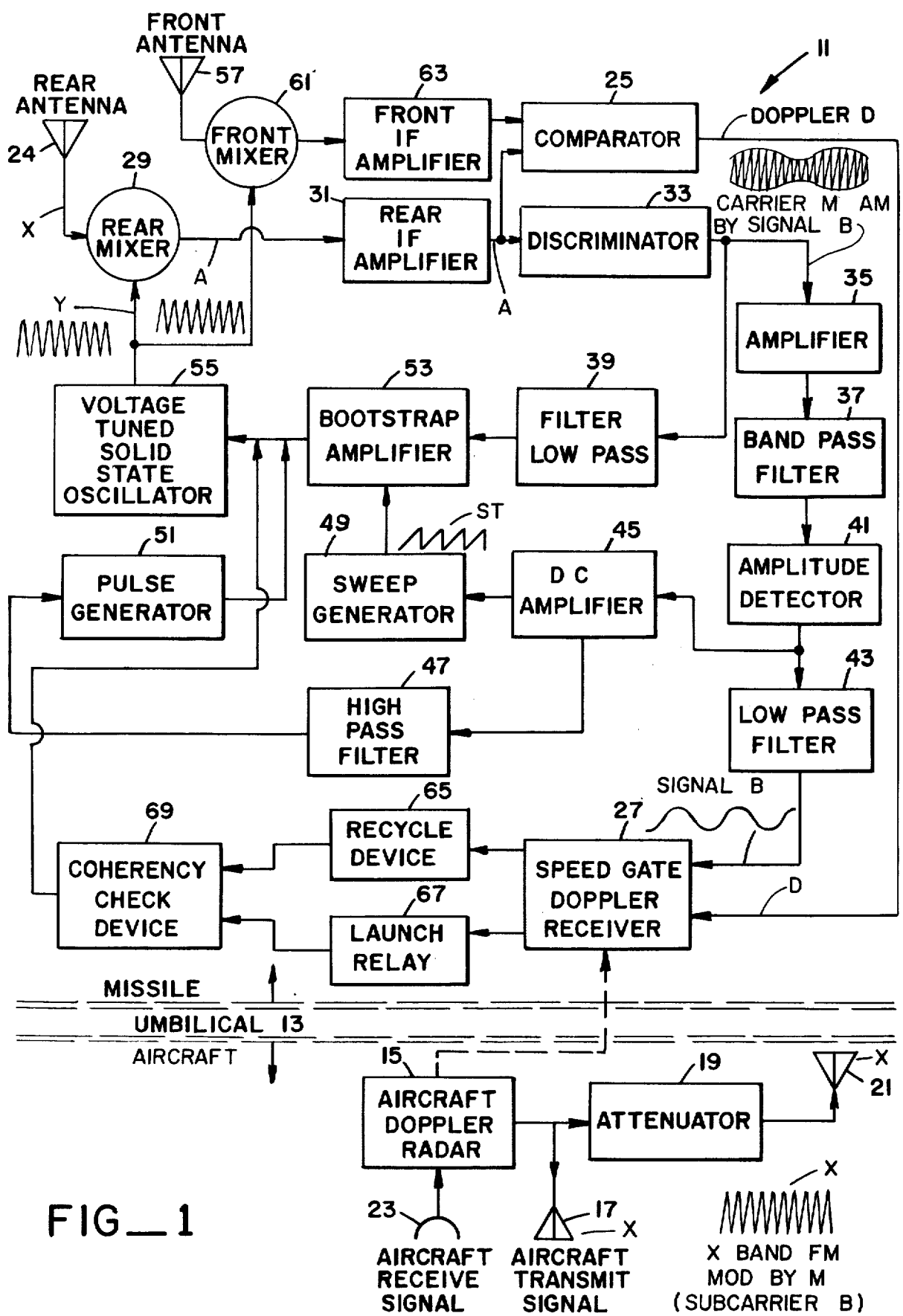
FIG_1

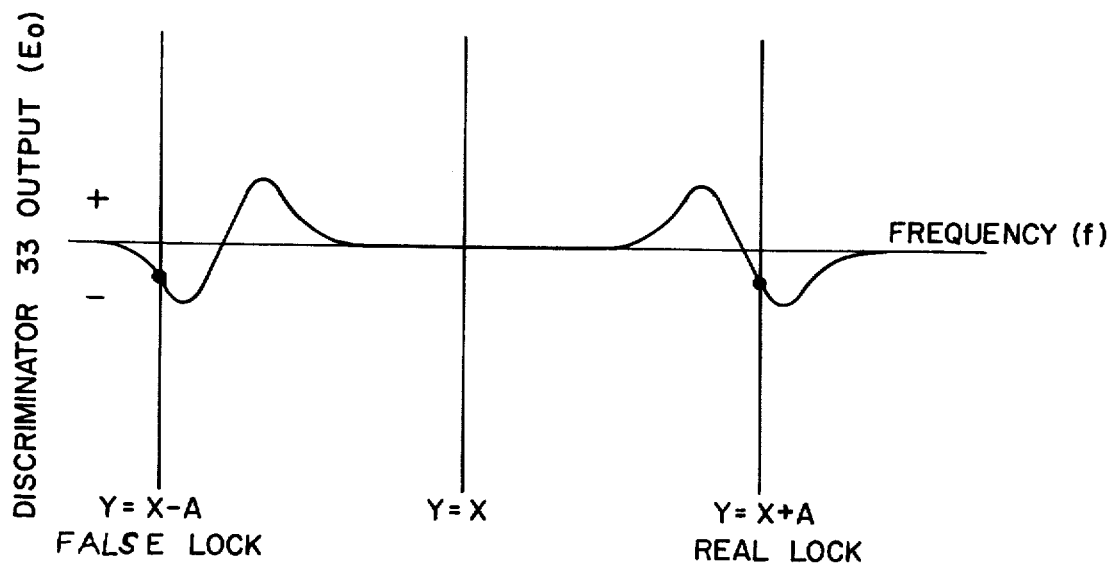
FIG_3
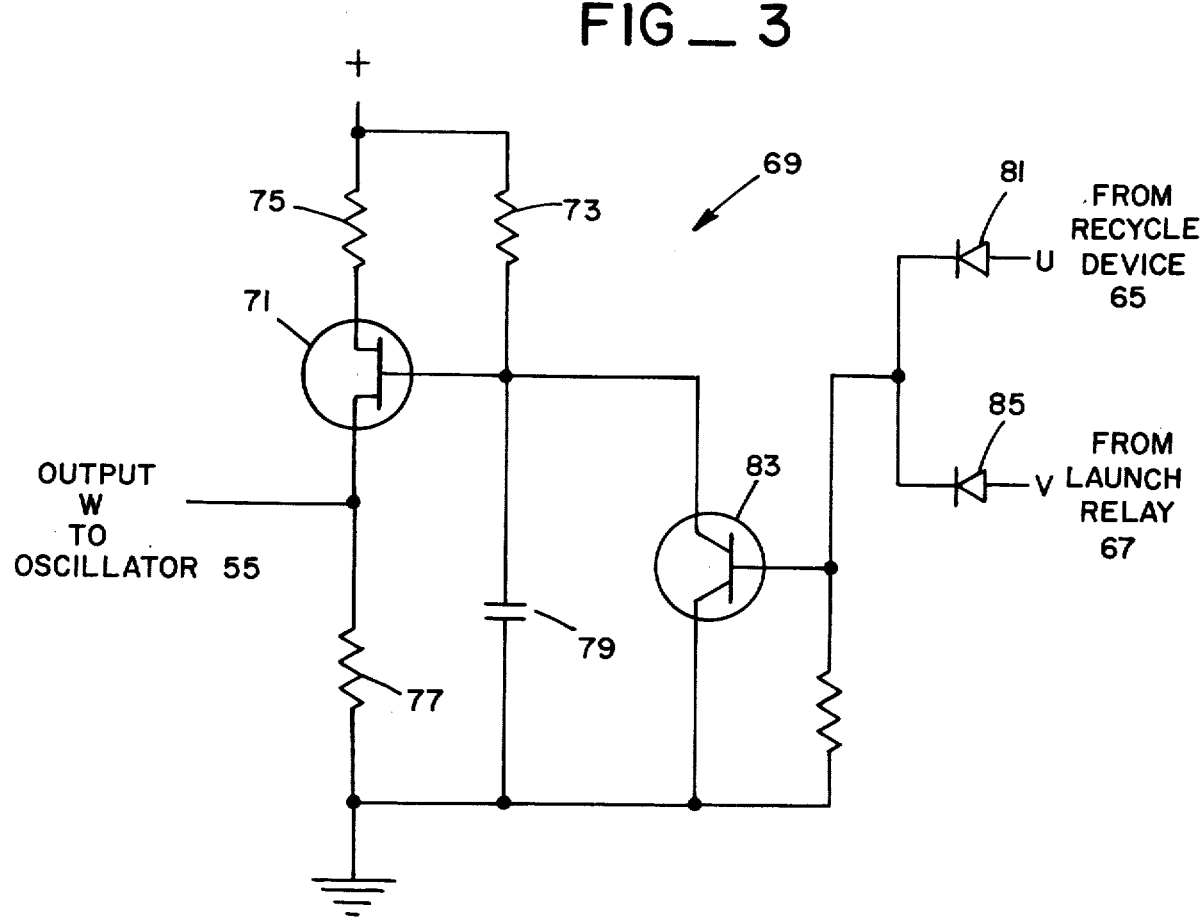
FIG_2

AUTOMATIC FREQUENCY CONTROL SYSTEM

BACKGROUND OF THE INVENTION

1. Field of the Invention

The present invention relates to an automatic frequency control system and more particularly to a solid state automatic frequency control system that is particularly suited for use with an aircraft launched radar controlled guided missile.

2. Description of the Prior Art

Prior missile automatic frequency control systems have included klystron tubes and compatible automatic frequency control systems. In these prior klystron type systems it was necessary to tune the system by electrical and mechanical techniques that included the use of limit switches, relays and klystron tuning motors. Several disadvantages were encountered by the use of these klystron operational techniques. These included excessive missile search time, narrow band klystron electronic tuning during flight, unreliable image locking and unreliable mechanical systems on the missile and on the aircraft. These disadvantages have been overcome by the solid state frequency control systems of the present invention.

SUMMARY OF THE INVENTION

Briefly, the present invention is an automatic frequency control system that is particularly suited for use with an aircraft launched radar controlled guided missile. The missile automatic frequency control system is made entirely of solid state devices including a voltage tuned solid state oscillator. The system employs a search mode of operation and two lock modes of operation. The search mode of operation occurs prior to missile launch when the aircraft radar and the missile control system are both scanning for a target and the reflected signal from the target has not been received by the missile control system. The two lock modes of operation are false lock and real lock. False lock occurs when the missile receives a false signal from the doppler radar of a nearby aircraft, for example. Real lock occurs during missile free flight when the missile receives a reflected radar signal from the target.

STATEMENT OF THE OBJECTS OF THE INVENTION

An object of the present invention is to provide an effective and reliable automatic frequency control system;

Another object of the present invention is to provide a solid state automatic frequency control system;

Still another object of the present invention is to provide a solid state automatic frequency control system that is particularly suited for use on a radar controlled guided missile;

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a block diagram of the automatic frequency control system of the present invention;

FIG. 2 is a schematic diagram of the coherency check device used in the automatic frequency control system of FIG. 1; and FIG. 3 is a curve illustrating the output of the discriminator used in the automatic frequency control system of FIG. 1.

DESCRIPTION OF THE PREFERRED EMBODIMENT

In FIG. 1 is a schematic diagram of the automatic frequency control system 11 of the present invention. This system has been found to be particularly useful in aircraft launched missile systems. The missile portion of the system is illustrated in FIG. 1 above the broken lines, indicating the umbilical connection 13, and the aircraft portion is illustrated below the broken lines.

The aircraft portion of the system includes aircraft doppler radar 15, one output of which is connected to both aircraft transmit antenna 17 and attenuator 19. The output of attenuator 19 is applied to a small aircraft transmit antenna 21. An aircraft receive antenna 23 is connected to the input of aircraft doppler radar 15. Receive antenna 23 receives a signal when the signal transmitted from antenna 17 is reflected from a target, not shown, onto the receiving element thereof. Antenna 21 functions to transmit the radar doppler signal to rear missile antenna 24. The other output of doppler radar 15 is applied through the umbilical connection 13 to one of the three inputs of speed gate doppler receiver 27. The transmitted signal (X) from the aircraft doppler radar 15 has an X band carrier, and frequency modulated on this carrier is an information signal M which is AM modulated by a subcarrier signal B (not shown). The processing of these signals by the missile control system will be hereinafter explained in detail.

The missile portion of the automatic frequency control system 11 includes rear missile antenna 24 the output of which is connected to one of the inputs of rear mixer 29. The output of mixer 29 is connected to the input of rear IF amplifier 31, the output of which is connected to the input of discriminator 33. The output of discriminator 33 is connected to the inputs of amplifier 35 and low pass filter 39. The output of low pass filter 39 is connected to the input of bootstrap amplifier 53 the output of which is connected to voltage tuned solid state oscillator 55. The output of amplifier 35 is connected to the input of band pass filter 37, the output of which is connected to amplitude detector 41. The output of amplifier detector 41 is connected to the inputs of DC amplifier 45 and low pass filter 43. The output of low pass filter 43 is connected to one of the three inputs of speed gate doppler receiver 27, the outputs of which are connected to the inputs of recycle device 65 and launch relay 67. The outputs of recycle device 65 and launch relay 67 are connected to the inputs of coherency check device 69, the output of which is connected to the input of voltage tuned solid state oscillator 55. The output of oscillator 55 is connected to the inputs of rear mixer 29 and front mixer 61. The outputs of DC amplifier 45 are connected to the inputs of sweep generator 49 and high pass filter 47. The output of high pass filter 47 is connected to the input of pulse generator 51, the output of which is connected to the input of oscillator 55. The output of sweep generator 49 is connected to the input of bootstrap amplifier 53. The outputs of front IF amplifier 63 and rear IF amplifier 31 are connected to the inputs of comparator 25 the output of which is connected to the third input of speed gate doppler receiver 27. The output of front antenna 57 is connected to the input of front mixer 61, the output of which is connected to the input of front IF amplifier 63.

The operation of the automatic frequency control system 11 will now be described in relation to FIG. 1 and the various signals associated therewith. Assume an aircraft is flying and its search radar, not shown, sees a target that is beyond the range of the missile. At this stage the missile control system and the aircraft control system are both inactive. Upon receiving this target information the pilot flies toward the target to get within missile range. When he is within missile range he turns on power, not shown, to all elements of the missile control system, including automatic frequency control system 11, and to all elements of the aircraft missile control system. At this time the pilot also sets into operation the aircraft doppler radar 15. The aircraft doppler radar 15 transmits X band signals, hereinafter referred to as the X signal, from the transmit antenna 17 and receives reflected signals from the target on antenna 23. When doppler radar 15 transmits signals from transmit antenna 17 and receives no reflected signals from the target on antenna 23, this will be referred to as the search mode of missile operation. When the transmitted signal from antenna 17 is reflected from the target and is received from the target and is received by antenna 23, this will be referred to as the lock modes of missile operation. There are two lock modes of operation (1) false lock and (2) real lock. False lock occurs when rear antenna 24 of the missile receives a false X signal from the aircraft doppler radar of a nearby aircraft, for example. Real lock occurs during missile free flight, after the missile is launched from the aircraft, and the missile front antenna 57 is receiving reflected signals from the target.

Prior to missile launch and during both search and lock modes of operation the output of aircraft doppler radar 15, X signal, is applied to transmit antenna 17 and through attenuator 19 to small transmit antenna 21. Aircraft mounted small transmit antenna 21 is directed toward missile rear antenna 24. The transmitted X signal from aircraft antenna 21 is received by rear missile antenna 24, during both the search and lock modes of operation, and is applied to rear mixer 29 where the signal is mixed with the output signal of voltage tuned solid state oscillator 55. The output signal of oscillator 55 will be hereinafter referred to as the Y signal. The output of rear mixer 29 will be a combination of signals consisting of the X signal from rear antenna 24 and the Y signal from oscillator 55. This output will be the sum of the X and Y signals, and the difference signal between the X and Y signals. Also X' signals, that may be present from nearby aircraft and other unwanted sources, appearing on the missile rear antenna 24 will be present at the output of rear mixer 29, mixing with the X and Y signals described above.

Since the X and Y signals are typically in the X band ($10^{10}$ Hz) only the difference signals, X-Y absolute, will be considered since they are selected to be within the operating range of the rear IF amplifier 31 and the front IF amplifier 63. The difference signal, hereinafter referred to as the A signal and appearing at the output of rear mixer 29, will contain all the modulation information that is transmitted on the X signal from the aircraft antenna 21. When the A signal output from rear mixer 29 is approximately equal to the tuned frequency of the rear IF amplifier 31, an amplifier A signal will appear at the inputs of discriminator 33 and comparator 25. During the search mode only, noise and momentary bursts of A signals will appear at the output of rear IF amplifier 31 and during lock mode constant A signals will appear at the output of rear IF amplifier 31.

During search mode of operation, when noise only appears at the output of rear mixer 29, the outputs of rear IF amplifier 31, comparator 25, discriminator 33, amplifier 35, and bandpass filter 37 will also be noise. The output of amplitude detector 41 will be very small DC voltage that is not of sufficient magnitude to affect DC amplifier 45. With no output from DC amplifier 45 the sweep generator 49 will be permitted to generate a periodic sawtooth voltage ST during the search mode of operation. The sawtooth voltage, ST, at the output of sweep generator 49 will be amplified by bootstrap amplifier 53. The sawtooth voltage output of the bootstrap amplifier 53 is then applied to the input of the voltage tuned solid state oscillator 55 and causes the oscillator output, Y signal, to correspondingly sweep periodically a prescribed range of frequencies in the X band. When both an X signal from the aircraft doppler radar 15 and the sweeping Y signal from the voltage tuned solid state oscillator 55 appear at the inputs of rear mixer 29, a corresponding sweeping A signal will appear at the mixer output and the rear IF amplifier 31 input. As the A signal frequency sweeps periodically through the tuned frequency of rear IF amplifier 31, periodic bursts of A frequency will appear at the output of rear IF amplifier 31 and the input of discriminator 33. Discriminator 33 will demodulate the M signal, amplitude modulated by the B signal, from the A signal which originally modulated the X signal from the aircraft doppler radar 15. In addition to carrier signal M with the AM signal B, there will be a DC voltage appearing at the output of discriminator 33. This DC component at the discriminator output will have a polarity and amplitude which will be a function of how close the A signal is to the tuned frequency of the discriminator 33. Low pass filter 39 will pass the DC component of the discriminator 33 output to the input of bootstrap amplifier 53, and will reject carrier M with its AM component, signal B. Amplifier 35 and band pass filter 37 will amplify and pass carrier signal M with its signal B AM component and reject DC and all other frequencies appearing at the output of discriminator 33. Amplitude detector 41 demodulates signal B from carrier M and develops a negative DC voltage approximately proportional to the level of carrier M. The B signal component passes through low pass filter 43 to the speed gate doppler receiver 27 input. The negative DC component of the amplitude detector 41 output is fed to the DC amplifier 45 input where it is inverted and amplified and applied to the input of sweep generator 49.

In summary, during the search mode when X signals appear on rear antenna 24 and bursts of A signals appear at the input of discriminator 33, as Y signals from voltage tuned solid state oscillator 55 sweep periodically in frequency, bursts of carrier M, with its signal B AM and DC components, appear at the output of discriminator 33. Corresponding bursts of B signals and negative DC voltages will appear at the output of amplitude detector 41. The negative DC bursts, or pulses, will be amplified and inverted by DC amplifier 45 and applied to sweep generator 49. The positive output of DC amplifier 45 will disable sweep generator 49 thereby discontinuing the Y frequency sweep of the voltage tuned solid state oscillator 55 stopping it at a Y frequency where the absolute value of Y−X=A at the tuned frequency of rear IF amplifier 31. This will be referred to as the X signal capture process. When the X signal is captured the output of discriminator 33 will be a continuous carrier M with B signal and a DC voltage. The output of amplitude detector 41 will be a continuous negative DC with a B signal, and sweep generator 49 will remain disabled. When this signal capture occurs, the missile automatic frequency control system will be in the lock mode of operation.

When the missile lock mode of operation occurs, the DC component output of discriminator 33 will pass through low pass filter 39, be amplified by bootstrap amplifier 53, and be applied to the input of voltage tuned solid state oscillator 55. If for any reason the X and/or Y signals drift in frequency, the A signal at the input to discriminator 33 will experience a corresponding drift causing the DC output of the discriminator to change. This DC change will cause the Y frequency output of the voltage tuned solid state oscillator 55 to change in the direction such that the A frequency will be maintained at the tuned frequency of discriminator 33, thus achieving frequency tracking.

During the false lock mode of operation when missile automatic frequency control system 11 is tracking an X' signal from a nearby aircraft, signal B appearing at the output of low pass filter 43 will be compared against the B signal from aircraft doppler radar 15 for coherency in speed gate doppler receiver 27. Without coherency during false lock mode of operation there will be no output from speed gate doppler receiver 27 and thus no input to recycle device 65. With no input to recycle device 65, there will be no input to coherency check device 69. Coherency check device 69 will then generate positive pulses at its output which will be applied to the input to voltage tuned solid state oscillator 55 causing a sudden change in the Y signal frequency output. The corresponding sudden change in Y frequency will cause the A signal at the input of discriminator 33 to disappear. All outputs of discriminator 33 will then disappear and sweep generator 49 will be activated causing the missile automatic frequency control system 11 to return to the previously described search mode of operation. When the missile again locks on an X signal, this time the X signal being from aircraft doppler radar 15, coherency of B signal inputs from low pass filter 43 and aircraft doppler radar 15 will be experienced in speed gate doppler receiver 27 causing a DC to be developed at its output which is applied to the input of recycle device 65. The output of recycle device 65 will be a DC voltage which will deactivate the pulse generator, shown in FIG. 3, in coherency device 69 thus allowing the lock mode of operation to remain.

In FIG. 3 is shown coherency check device 69. The pulse generator section of coherency check device 69 consists of transistor 71, resistors 73, 75, 77 and capacitor 79. Transistor 71 is a unijunction transistor which generates positive pulses w, the rate of which is determined by values of resistor 73 and capacitor 79. The values are selected so that positive pulses occur at two second intervals. The output U from recycle device 65 is applied through diode 81 to the base of transistor 83 and the output V from launch relay 67 is applied through diode 85 to the base of transistor 83. When the U or V, or both U and V inputs are positive, then transistor 83 saturates and effectively grounds the junction between resistor 73 and capacitor 79. When this occurs, transistor 71 will be disabled as a pulse generator.

Diodes 81 and 85 function to isolate the U and V input signals. There are three conditions which are as follows:

1. Prelaunch and coherent lock.
    A. No input to U from launch relay 67.
    B. Positive input to V from recycle device 65.
    C. Transistor 83 saturates and disables transistor 71.
2. Prelaunch and false (no coherent) lock.
    A. No input to U from launch relay 67.
    B. No input to V from recycle device 65.
    C. Transistor 83 turns off and enables transistor 71.
    D. Transistor 71 generates positive pulses at two second intervals.
3. Post launch.
    A. Positive input of U from launch relay 67.
    B. Transistor 83 saturates and disables transistor 71.

Referring to FIGS. 1 and 3, during the lock mode of operation on the X signal from aircraft doppler radar 15, either real lock or image lock conditions may occur. During image lock, a signal approximately equal to the tuned frequency of rear IF amplifier 31, will occur when the Y signal frequency is below the X signal frequency. During real lock the Y signal frequency is above the X signal frequency. During image lock the A signal frequency will be located on an outer slope of the discriminator 33 and the discriminator will be sensitive to the A signal amplitude variations and the normal noise of IF amplifier 31 and rear mixer 29. During real lock the A signal frequency will be located between discriminator peaks and the discriminator 33 will not be sensitive to the A signal and other noise amplitude variations. From FIG. 2 it can be seen that for both image and real lock the DC outputs of discriminator 33 are equal and negative, and that the slopes on the discriminator curves, delta EO/f are equal and negative allowing for a stable automatic frequency control lock mode of operation.

Even though a stable lock mode of operation is experienced during image lock, image lock is undesirable because the A signal frequency will not be centered in the tuned frequency of rear IF amplifier 31 and discriminator 33. In affect, the receiving system will be slightly detuned. Also, during image lock, amplitude limiting in rear IF amplifier 31 cannot occur and it will therefore be operating at maximum gain and cause noise components to appear at the output of discriminator 33 and cause the voltage tuned solid state oscillator 55 to be frequency modulated by this noise.

During image lock, noise appearing at the output of discriminator 33 will be amplified along with carrier M in amplifier 35, pass through bandpass filter 37, be detected by amplitude detector 41, and be amplified by DC amplifier 45. The noise output of DC amplifier 45 will pass through high pass filter 47 and be applied to pulse generator 51 input. Noise input to pulse generator 51 will cause the pulse generator to generate positive pulses. These positive pulses will be applied to the input of voltage tuned solid state oscillator 55 and cause the Y signal frequency to shift suddenly. This sudden shift in Y frequency causes a sudden shift in the A signal frequency and its subsequent disappearance from the input of discriminator 33. As a consequence, sweep generator 49 will generate a sawtooth signal ST causing the Y signal frequency output of voltage tuned solid state oscillator 55 to sweep periodically placing the missile automatic frequency control system 11 in the search mode of operation. During real lock mode of operation there will be no noise out of discriminator 33 and thus pulse generator 51 will be disabled.

Prior to missile launch, launch relay 67 will have no affect on coherency check device 69. After launch, launch relay 67 will disable coherency check device 69. AFter launch, the output of aircraft doppler radar 15 to the input of speed gate doppler receiver 27 is disconnected. Missile front antenna 57 will receive reflected X signals from the target. These reflected X signals will mix with Y signals in front mixer 61 generating A signals which are subsequently amplified by front IF amplifier 63 and compared with A signals from rear IF amplifier 31 in comparator 25. The output of comparator 25 is doppler signals D with the B signal superimposed on them. This B signal going to speed gate doppler receiver 27 will be compared for coherency with the B signal coming from low pass filter 43 in speed gate doppler receiver 27 during flight. If coherency exists then the missile will track and close in on the target, by the missile guidance and control system, not shown.

What is claimed is:

1. An automatic frequency control system comprising:
   a. first means for receiving reflected radar signals from a target;
   b. second means for receiving radar signals directly from a radar transmitter means;
   c. a voltage tuned solid state oscillator the output of which is connected to said first and second means;
   d. third means responsive to the output of said second means for applying a first control voltage to said solid state oscillator;
   e. fourth means responsive to the output of said first means for applying a second control voltage to said solid state oscillator;
   f. fifth means responsive to the output of said second means; and
   g. sixth means responsive to the output of said fifth means for modifying the output of said third means.

2. The automatic frequency control system of claim 1 including:
   a. seventh means responsive to said sixth means for applying a third control voltage to said solid state oscillator.

3. The automatic frequency control system of claim 2 including:
   a. a low pass filter connected to the output of said fifth means and to the input of said fourth means.

4. The automatic frequency control system of claim 3 wherein:
   a. said first means includes a front antenna, a front mixer, a front IF amplifier and a comparator connected in series.

5. The automatic frequency control system of claim 4 wherein:
   a. said second means includes a rear antenna, a rear mixer, a rear IF amplifier and a discriminator connected in series.

6. The automatic frequency control systems of claim 5 wherein:
   a. the output of said rear IF amplifier is connected to an input of said comparator.

7. The automatic frequency control device of claim 6 wherein:
   a. said third means includes a low pass filter and a bootstrap amplifier connected in series.

8. The automatic frequency control system of claim 7 wherein:
   a. said fourth means includes a speed gate doppler receiver the outputs of which are respectively connected to the inputs of a recycle device and a launch relay the outputs of which are connected to the inputs of a coherency check device.

9. The automatic frequency control system of claim 8 wherein:
   a. said fifth means includes an amplifier, a band pass filter and an amplitude detector connected in series.

10. The automatic frequency control system of claim 9 wherein:
    a. said sixth means includes a DC amplifier and a sweep generator connected in series.

* * * * *